United States Patent
Antony et al.

(10) Patent No.: US 9,659,140 B2
(45) Date of Patent: *May 23, 2017

(54) CRITICAL REGION IDENTIFICATION

(71) Applicant: International Business Machines Corporation, Armonk, NY (US)

(72) Inventors: George Antony, Kerala (IN); Christopher J. Berry, Hudson, NY (US); Ricardo H. Nigaglioni, Austin, TX (US); Sridhar H. Rangarajan, Karnataka (IN); Sourav Saha, Kolkata (IN); Vinay K. Singh, Gorakhpur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,622

(22) Filed: Jul. 28, 2015

(65) Prior Publication Data

US 2016/0070849 A1    Mar. 10, 2016

Related U.S. Application Data

(63) Continuation of application No. 14/481,154, filed on Sep. 9, 2014, now Pat. No. 9,378,326.

(51) Int. Cl.
   *G06F 17/50*   (2006.01)

(52) U.S. Cl.
   CPC ...... *G06F 17/5081* (2013.01); *G06F 17/5072* (2013.01); *G06F 17/50* (2013.01);
   (Continued)

(58) Field of Classification Search
   CPC ............... G06F 17/505; G06F 17/5072; G06F 17/5022; G06F 17/5077; G06F 17/5081;
   (Continued)

(56) References Cited

U.S. PATENT DOCUMENTS

| | | | | |
|---|---|---|---|---|
| 5,751,164 A | * | 5/1998 | Sharpe-Geisler | H03K 19/17704 326/33 |
| 5,778,216 A | * | 7/1998 | Venkatesh | G06F 17/5031 713/500 |

(Continued)

OTHER PUBLICATIONS

List of IBM Patents or Patent Applications Treated as Related; (Appendix P), Filed Apr. 5, 2016; 2 pages.

(Continued)

*Primary Examiner* — Helen Rossoshek
(74) *Attorney, Agent, or Firm* — Cantor Colburn LLP; Margaret A. McNamara

(57) ABSTRACT

A method and system to identify a region of a design block of an integrated circuit for redesign are described. The method includes dividing the design block into grids, each of the grids including a corresponding number of logic elements. The method also includes filtering each of the grids based on a specified criteria, the filtering including determining a number (B) of the corresponding logic elements among a total number (A) of the logic elements in each grid that meet the specified criteria. The region is a set of two or more of the grids based on a result of the filtering.

6 Claims, 7 Drawing Sheets

(52) U.S. Cl.
CPC ........ *G06F 17/505* (2013.01); *G06F 17/5022* (2013.01); *G06F 17/5045* (2013.01); *G06F 17/5077* (2013.01); *G06F 2217/78* (2013.01)

(58) Field of Classification Search
CPC .. G06F 2217/78; G06F 17/5045; G06F 17/50; G06F 17/5031; G06F 2217/84; G06F 17/5054; G06F 17/5068; G06F 17/5009; G06F 1/10; G06F 1/324; G06F 1/3296; G06F 2217/06; H01L 23/528
See application file for complete search history.

(56) References Cited

U.S. PATENT DOCUMENTS

| | | | | | |
|---|---|---|---|---|---|
| 5,894,565 | A * | 4/1999 | Furtek | ................ | H03K 19/1735 326/38 |
| 5,930,148 | A * | 7/1999 | Bjorksten | ........... | G06F 17/5031 716/104 |
| 6,067,650 | A * | 5/2000 | Beausang | ........ | G01R 31/31858 714/724 |
| 6,102,964 | A * | 8/2000 | Tse | ..................... | G01R 31/3177 716/116 |
| 6,145,117 | A * | 11/2000 | Eng | ..................... | G06F 17/5045 716/105 |
| 6,212,668 | B1 * | 4/2001 | Tse | ..................... | G06F 17/5072 716/125 |
| 6,480,815 | B1 * | 11/2002 | Olson | ................. | G06F 17/5022 703/14 |
| 6,539,536 | B1 * | 3/2003 | Singh | ................. | G06F 17/5045 716/102 |
| 6,928,635 | B2 * | 8/2005 | Pramanik | ............ | G06F 17/5081 716/53 |
| 7,089,527 | B2 * | 8/2006 | Hart | .................... | G06F 17/5054 257/E27.067 |
| 7,107,568 | B2 * | 9/2006 | Cronquist | ........... | G06F 17/5072 716/103 |
| 7,197,734 | B1 * | 3/2007 | Singh | ................. | G06F 17/5054 716/116 |
| 7,225,423 | B2 * | 5/2007 | Bhattacharya | ...... | G06F 17/5045 716/102 |
| 7,337,100 | B1 * | 2/2008 | Hutton | ................ | G06F 17/5068 703/13 |
| 7,463,057 | B1 * | 12/2008 | Rahim | ............... | H03K 19/1776 326/113 |
| 7,477,073 | B1 * | 1/2009 | Tuan | ................ | H03K 19/17736 326/101 |
| 7,559,046 | B1 * | 7/2009 | Datta | .................. | G06F 17/5072 716/134 |
| 7,587,688 | B1 * | 9/2009 | Van Antwerpen | .. | G06F 17/5045 703/13 |
| 7,629,825 | B1 * | 12/2009 | Fung | ................ | H03K 19/17736 327/269 |
| 7,675,317 | B2 * | 3/2010 | Perisetty | ............ | H03K 19/0016 326/38 |
| 7,735,029 | B2 * | 6/2010 | Riviere-Cazaux | .. | G06F 17/5068 716/112 |
| 7,900,166 | B2 * | 3/2011 | Kariat | ................ | G06F 17/5036 703/14 |
| 7,902,864 | B1 * | 3/2011 | Hutton | ............ | H03K 19/17728 326/38 |
| 7,921,402 | B2 * | 4/2011 | He | ...................... | G06F 17/5022 703/16 |
| 7,934,188 | B2 * | 4/2011 | Alpert | ................. | G06F 17/5072 716/118 |
| 7,984,415 | B1 * | 7/2011 | Srinivasan | ............ | G06F 17/505 326/41 |
| 8,136,073 | B1 * | 3/2012 | Srinivasan | .......... | G06F 17/5072 716/119 |
| 8,176,459 | B2 * | 5/2012 | Chowdhury | .......... | G06F 17/505 716/106 |
| 8,181,130 | B1 * | 5/2012 | Fender | .................. | G06F 17/505 375/371 |
| 8,230,377 | B1 * | 7/2012 | Fang | .................... | G06F 17/5072 716/104 |
| 8,332,802 | B2 * | 12/2012 | Haugestuen | ........ | G06F 17/5031 716/133 |
| 8,418,113 | B1 * | 4/2013 | Alpert | ................. | G06F 17/5077 716/129 |
| 8,453,093 | B2 * | 5/2013 | Kim | ..................... | G06F 17/5072 716/110 |
| 8,589,849 | B1 * | 11/2013 | Borer | .................. | G06F 17/5054 716/119 |
| 8,595,668 | B1 * | 11/2013 | Soni | ...................... | G06F 17/505 716/108 |
| 8,949,763 | B1 * | 2/2015 | Fung | .................... | G06F 17/5054 326/37 |
| 9,030,231 | B1 * | 5/2015 | Lewis | .................. | H03K 19/177 326/41 |
| 9,417,984 | B1 * | 8/2016 | Drury | ................. | G06F 11/3457 |
| 2002/0069396 | A1 * | 6/2002 | Bhattacharya | ...... | G06F 17/5045 716/102 |
| 2005/0034089 | A1 * | 2/2005 | McGuffin | ............ | G06F 17/5022 716/109 |
| 2005/0204325 | A1 * | 9/2005 | Fung | ................... | G06F 17/5054 716/105 |
| 2009/0064068 | A1 * | 3/2009 | Ng | ...................... | G06F 17/5068 716/113 |
| 2010/0146469 | A1 * | 6/2010 | Chowdhury | .......... | G06F 17/505 716/113 |
| 2012/0102448 | A1 * | 4/2012 | Haugestuen | ........ | G06F 17/5036 716/134 |
| 2013/0135008 | A1 * | 5/2013 | Zhang | .................... | B82Y 10/00 326/41 |
| 2015/0234949 | A1 * | 8/2015 | Chakrabarti | ........ | G06F 17/5081 716/104 |
| 2016/0217248 | A1 * | 7/2016 | Antony | ............... | G06F 17/5081 |

OTHER PUBLICATIONS

George Antony et al., "Critical Region Identification", U.S. Appl. No. 15/090,982, filed Apr. 5, 2016.
List of IBM Patents or Patent Applications Treated as Related; (Appendix P), Filed Jul. 28, 2015; 2 pages.
George Antony et al., "Critical Region Identification", U.S. Appl. No. 14/481,154, filed Sep. 9, 2014.

* cited by examiner

CRITICAL REGION IDENTIFICATION

This application is a continuation of U.S. Pat. No. 9,378,326 issued Jun. 28, 2016, the disclosure of which is incorporated by reference herein in its entirety.

BACKGROUND

The present invention relates to synthesis of a design block of an integrated circuit, and more specifically, to critical region identification.

The development of an integrated circuit (IC) involves a number of steps, some of which are performed iteratively. Generally, a logic phase, which involves the design of the digital logic circuits of the IC, is followed by a physical design phase, in which the IC is subdivided into logic blocks for purposes of design and synthesis. As the size and complexity of these blocks increases, convergence of the design in terms of meeting all timing and power efficiency goals can take longer. This is because an improvement in timing or power consumption in one area or region of a block may adversely affect those same parameters in a different region.

SUMMARY

According to one embodiment of the present invention, a method of identifying a region of a design block of an integrated circuit for redesign includes dividing the design block into grids, each of the grids including a corresponding number of logic elements; filtering, using a processor, each of the grids based on a specified criteria, the filtering including determining a number (B) of the corresponding logic elements among a total number (A) of the logic elements in each grid that meet the specified criteria; and identifying, using the processor, the region as a set of two or more of the grids based on a result of the filtering.

According to another embodiment, a processing system to identify a region of a design block of an integrated circuit for redesign includes a processor configured to divide the design block into grids, each of the grids including a corresponding number of logic elements, filter each of the grids based on a specified criteria, the filtering including determining a number (B) of the corresponding logic elements among a total number (A) of the logic elements in each grid that meet the specified criteria, and identify the region as a set of two or more of the grids based on a result of the filtering; and a display device configured to display the result of the filtering.

According to yet another embodiment, a computer program product includes a tangible storage medium readable by a processor and storing instructions for execution by the processor to perform a method of identifying a region of a design block of an integrated circuit for redesign. The method includes dividing the design block into grids, each of the grids including a corresponding number of logic elements; filtering each of the grids based on a specified criteria, the filtering including determining a number (B) of the corresponding logic elements among a total number (A) of the logic elements in each grid that meet the specified criteria; and identifying the region as a set of two or more of the grids based on a result of the filtering.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, in the physical design phase of an integrated circuit design, the synthesis of a design block may be time consuming, and convergence of the design may be difficult to achieve when improvements in timing and power consumption in one region of a given block affect the timing and power consumption in other regions of the block. While efficiency may be improved and convergence of the design synthesis may be reached more quickly when only an area of a block needing attention is addressed (thereby leaving the performance of other regions unchanged), that area must first be identified. Embodiments of the systems and methods discussed herein relate to critical region identification in integrated circuit design. Thus, within a given block undergoing the synthesis process, a region to be targeted for timing and power efficiency improvement may be isolated based on the embodiments discussed herein. The specific techniques used to improve timing and/or power efficiency of a given region are not detailed here. Instead, the focus is on the identification of the region.

Figure 1:
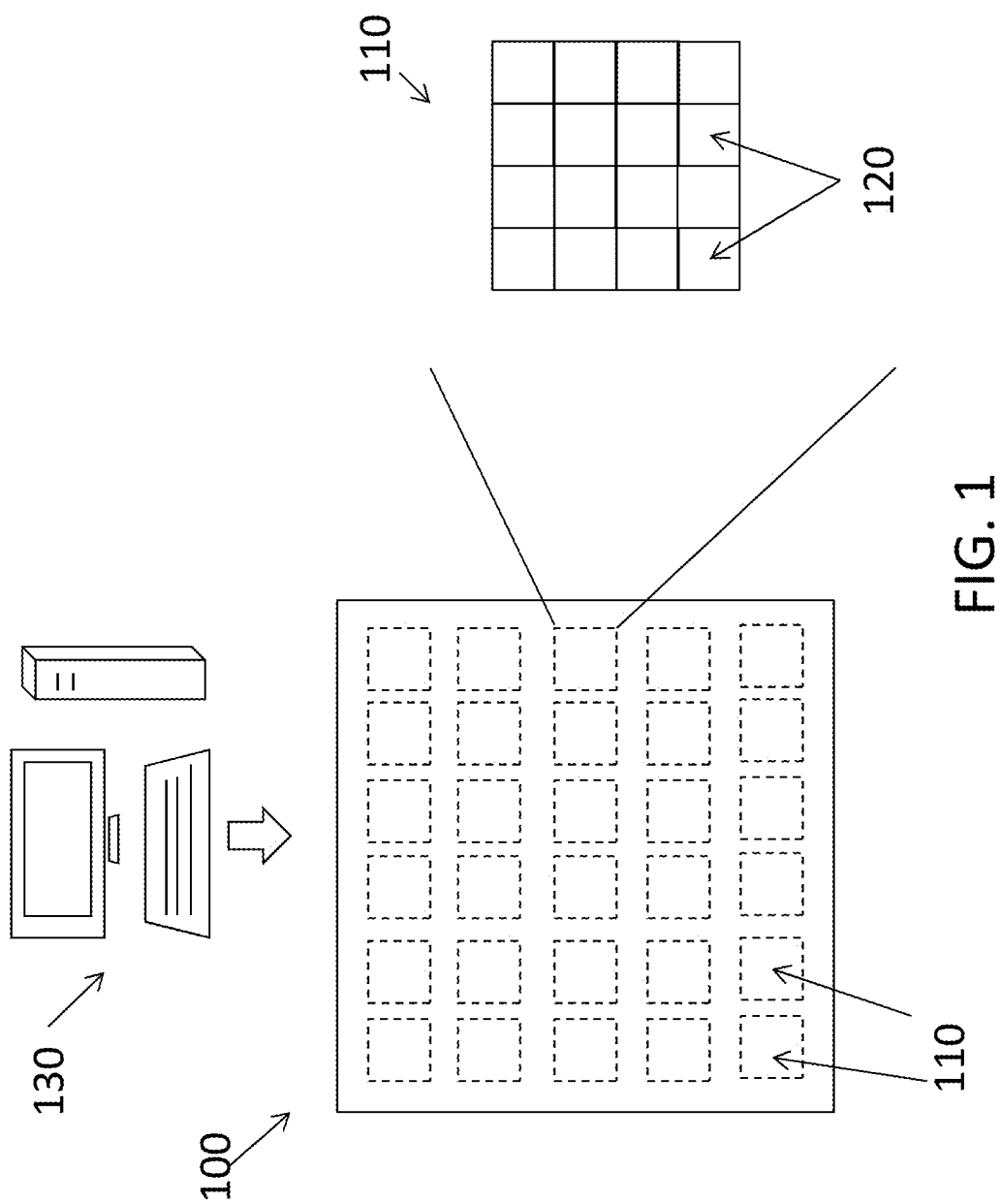
FIG. 1 is a block diagram of an integrated circuit (IC) developed according to embodiments of the invention.

FIG. 1 is a block diagram of an integrated circuit (IC) 100 developed according to embodiments of the invention. The physical implementation of the IC 100 results from the logic design and routing that is finalized using one or more processors and one or more memory devices of a processing system 130 such as a computer, for example. The processing system 130 may implement instructions stored in the one or more memory devices or another tangible storage medium external to the processing system 130. Embodiments of the analysis described herein to perform the critical region identification are performed by the processing system 130 alone or in conjunction with other processing system 130. The logic circuits of the IC 100 are subdivided into blocks 110 or logic blocks in the physical design phase. Each of the blocks 110 has a different number of logic elements and each of the blocks 110 undergoes a baseline synthesis or block analysis to determine whether the block 110 design meets timing and power consumption requirements. When a given block 110 does not meet the requirements, the critical region identification according to embodiments discussed herein may be performed. In the critical region identification process detailed below, each of the blocks 110 of interest is organized into grids 120. The grids 120 are equal-sized grids 120 as shown in FIG. 1 but may be of unequal sizes according to alternate embodiments. Because the cells or logic elements of a block 110 are typically not uniformly distributed, each grid 120 of a given block 110 (whether the grids 120 are equally or non-equally sized) will typically have a different number of cells. Embodiments of the critical region identification are now detailed below, with the identification process beginning at the baseline synthesis of the blocks 110. Timing analysis is discussed first, followed by power analysis.

Figure 2:
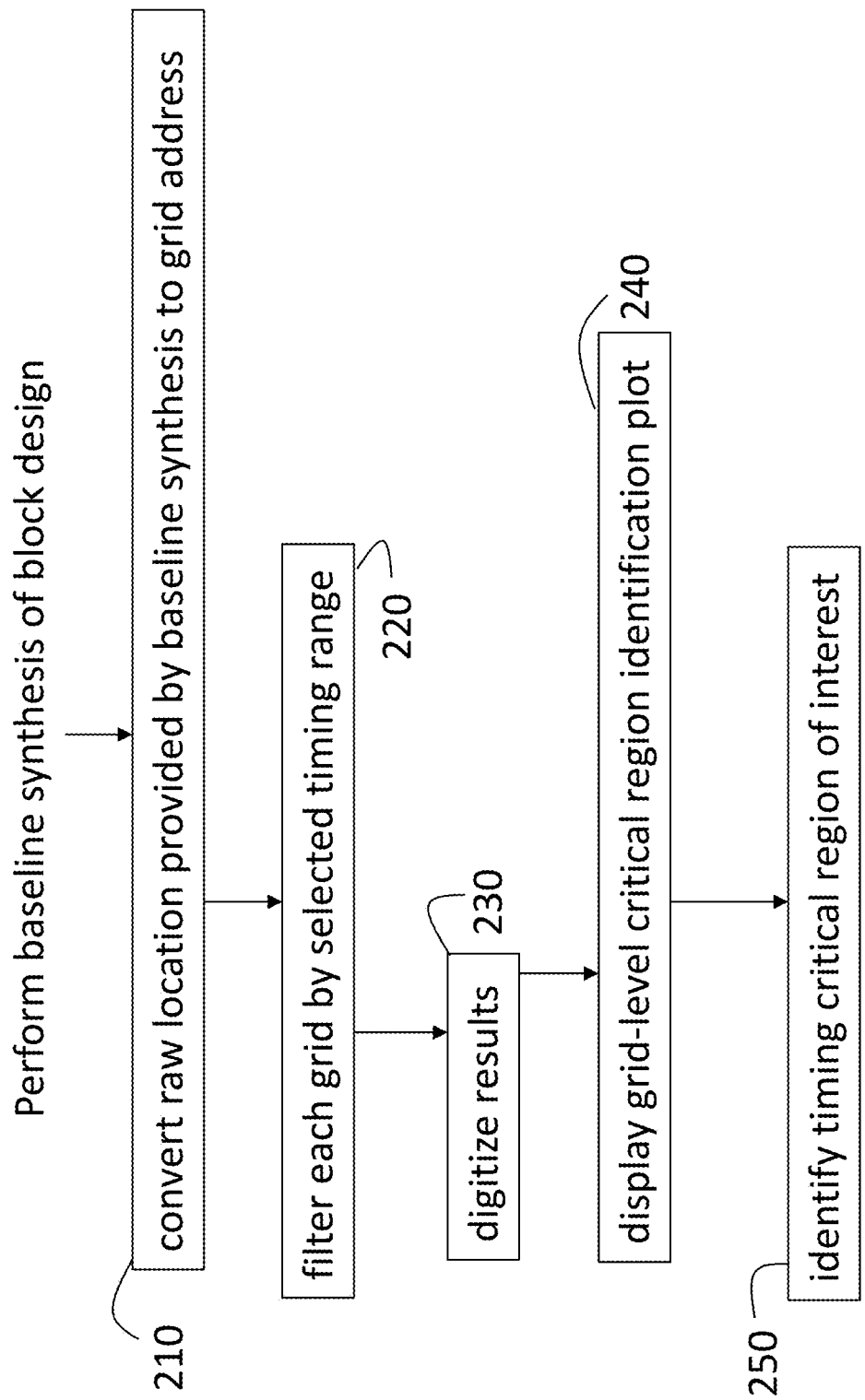
FIG. 2 is a process flow of a method of identifying a region of interest with regard to timing according to an embodiment of the invention.

FIG. 2 is a process flow of a method of identifying a region of interest with regard to timing according to an embodiment of the invention. The process flow begins after a baseline synthesis of the design of a given block 110. The standard baseline synthesis results (see e.g., 310 FIG. 3) include a raw location (x,y) (with reference to the block 110) of each cell of the block 110 on the IC 100. Converting the raw location provided by the baseline synthesis to a grid address 301 (FIG. 3), at process 210, includes determining the x,y grid 120 assignment corresponding with the raw x,y location on the IC 100 for the cell in the block 110. As noted above, all the grids 120 may be equally (or non-equally) sized but each grid 120 will generally have a different number of logic elements or cells. Thus, different numbers of cells will have the same grid address 301. Once the baseline synthesis results are organized according to the grids 120, the further processing is done on a per-grid basis. At process 220, filtering each grid 120 by a selected timing range includes specifying a timing range of interest and determining a ratio or relative score for each grid 120 with respect to the specified timing range of interest based on the timing achieved by cells of the grid 120. This is further detailed with reference to FIG. 3. Digitizing the filter results, at process 230, includes selecting a number of bits to represent the ratio associated with each grid 120. For example, a greater granularity may be discerned among the grids 120 with a three-bit code is used rather than a two-bit code. At process 240, displaying a grid-level critical region identification plot 410 (FIG. 4) facilitates a visual inspection of the block 110 based on color coding or otherwise illustrating the digitized results. The display may be on a display device of the processing system 130 or another display device. Identifying one or more timing critical regions of interest 510 (FIG. 5), at process 250, may be based on the displaying done as part of the process 240 or may be done automatically by the processing system 130 based on criteria provided to the processing system 130. Known grid clustering algorithms may be used by the processing system 130. For example, the processing system 130 may group as many grids 120 as possible (exceeding a provided threshold) that fail the timing requirement without including too many grids 120 (based on another provided threshold) that do meet the timing requirement into the region(s) of interest. By identifying and addressing regions rather than individual (non-co-located) grids 120, the overhead requirement (e.g., for the Region Based Synthesis (RBS)) may be minimized. Further, by including as few grids 120 as possible in the region that already meet timing requirements, wasted effort can also be minimized.

Figure 3:
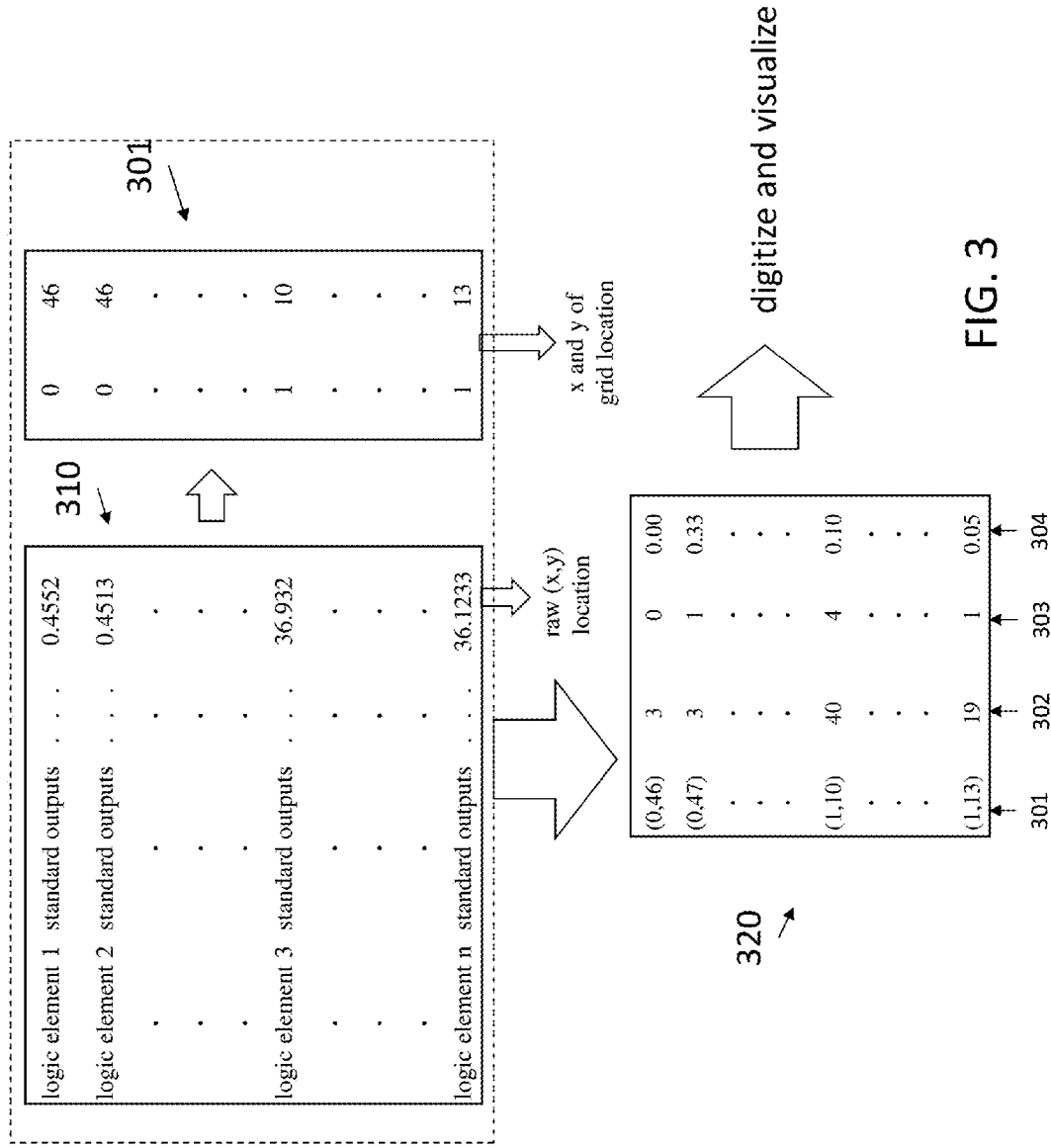
FIG. 3 is an exemplary illustration of the processes discussed with reference to FIG. 2 according to embodiments of the invention.

FIG. 3 is an exemplary illustration of the processes discussed with reference to FIG. 2 according to embodiments of the invention. The raw (x,y) location in the standard baseline synthesis results 310 are used to obtain the grid address 301 (process 210). Because a given grid 120 may (and likely will) include more than one cell, more than one cell will have the same grid address 301 in the standard baseline synthesis results 310. As noted above, once the grid address 301 is determined, processing is done on a per-grid basis. Thus, the timing table 320 has one entry per grid 120 of the block 110 and includes the grid address 301, the total number (A) 302 of logic elements or cells per grid 120, the number (B) 303 of cells that are in the specified timing range, and the ratio (A/B) 304 of cells of each grid 120 that fall in the specified timing range.

The timing results (process 220) for one specified timing range is shown in the timing table 320. In alternate embodiments, more than one timing range of interest may be specified, and each range may result in a separate timing table 320 (or in additional columns added to the timing table 320 shown in FIG. 3). The alternate embodiment highlights the time varying adaptability of the approach detailed herein. That is, based on the stage of development of the IC 100 (early or final stages), different timing ranges may be of interest. For example, three timing ranges may be used (three buckets established) to sort cells of each grid 120. The three ranges may be, for example, 0 to 25 picoseconds, 25 to 40 picoseconds, and 40 to 50 picoseconds. Thus, three timing tables 320 may be obtained that provide the ratio 304 of cells of each grid 120 that fall in the specified timing bucket (for each of the three buckets). The designer of the IC 100 is then free to select the timing table 320 or the timing bucket on which to focus redesign efforts. The dynamic analysis facilitated by embodiments detailed herein include the ability to change the timing focus as needed. Thus, the ranges specified for each timing bucket, as well as the number of timing buckets may be changed over the course of analysis and design of the IC 100. For explanatory purposes, one timing range of interest and one timing table 320, as shown in FIG. 3, are considered. As indicated in FIG. 3, once the timing table 320 is obtained, the results may be digitized (process 230) and visualized (process 240). Specifically, the ratio 304 is digitized. As noted above, the greater the number of bits used to code the ratio 304, the finer the granularity in the results. Each bit code may be assigned a color so that the results may be visualized in a color-coded grid map.

Figure 4:
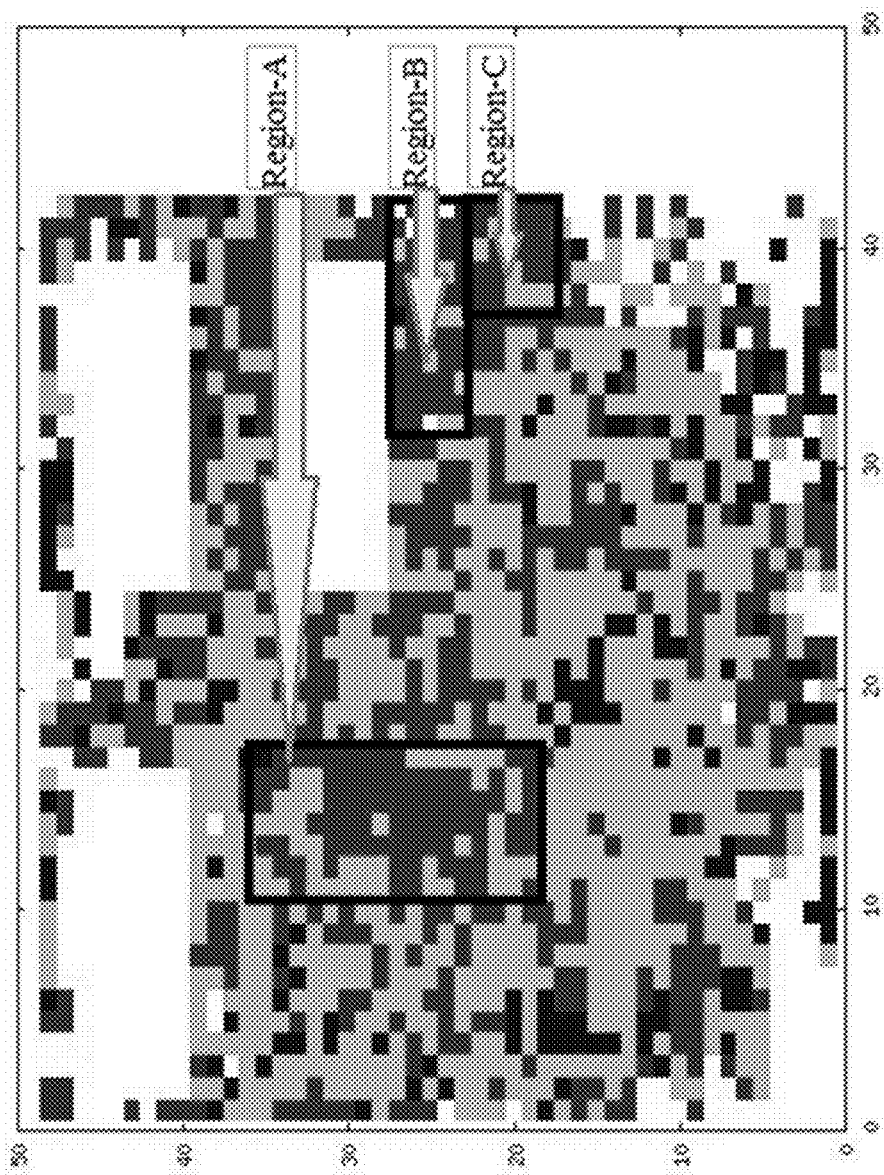
FIG. 4 illustrates an exemplary grid-level critical region identification plot according to embodiments of the invention.

FIG. 4 illustrates an exemplary grid-level critical region identification plot 410 according to embodiments of the invention. The grid-level critical region identification plot 410 indicates a color for each grid 120 of a block 110. The color corresponds with the digitized ratio 304 discussed above with reference to FIG. 3. As indicated for the example, some grids 120 correspond with a white color, which represents relatively the least number of cells of the grid 120 having timing in the specified range and some grids 120 correspond with a black color, which represents relatively the most number of cells of the grid 120 having timing in the specified range. Three exemplary regions A, B, C, are indicated on the exemplary grid-level critical region identification plot 410 (lightest to darkest grids 120 represent least to most ratio of cells with timing in the specified range). The exemplary regions A, B, C are groupings of grids 120 and are selected to include as many of the darkest grids 120 as possible.

Figure 5:
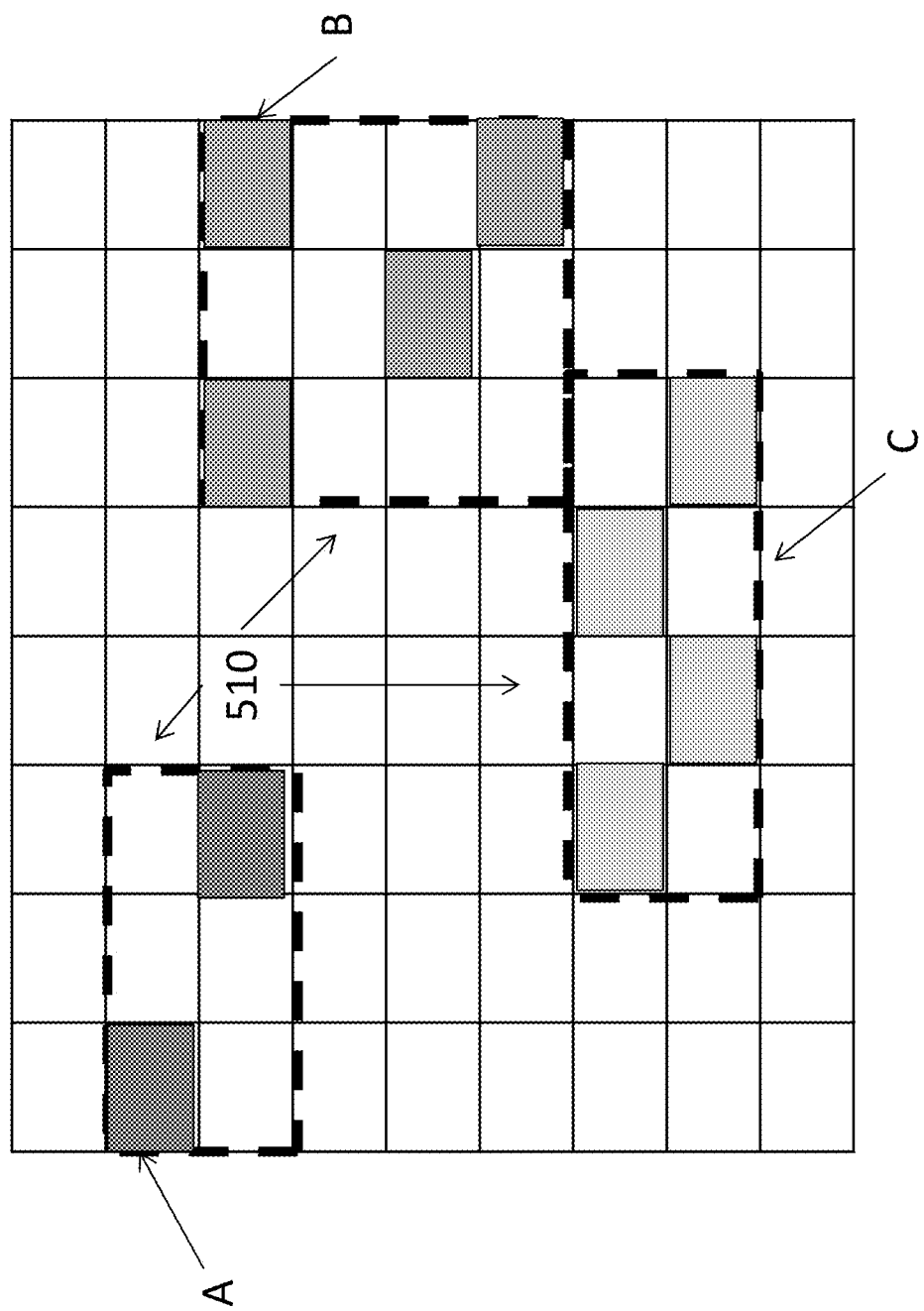
FIG. 5 illustrates exemplary timing critical regions of interest according to embodiments of the invention.

FIG. 5 illustrates exemplary timing critical regions of interest 510 according to embodiments of the invention. The exemplary regions A, B, C shown in FIG. 4 are isolated as the timing critical regions of interest 510. The shaded grids 120 in each of the exemplary timing critical region of interest 510 are grids 120 that did not meet the specified criteria but are clustered within regions A, B, and C in order to generate rectangular timing critical regions of interest 510. That is, while the shaded grids 120 do not meet the specified criteria, the regions A, B, and C into which the grids 120 are clustered meet a minimum specified ratio of grids 120 with target (specified) criticality. As noted above, a grid clustering algorithm may be used to identify the regions A, B, C. The regions A, B, C may be based on a threshold ratio 304 for a threshold number of grids 120 that meet the specified criteria, for example.

As noted above, both timing and power usage efficiency are of interest. Specifically, embodiments detailed herein relate to identifying one or more regions (groups of grids 120) that may require redesign to meet timing and/or power efficiency requirements. The identification of regions based on timing performance (of cells in the grids 120 of the region) was detailed above. Judgment of a cell based on timing is fairly straightforward because a design generally has a timing requirement that must be met. In the case of power analysis, however, there is no single metric requirement that may be used. The embodiments detailed below relate to defining a metric, Power Efficiency Score (PES), such that power analysis similar to the timing analysis discussed above may be performed. Consequently, timing critical regions and power critical regions and, as needed, regions requiring both timing and power-based redesign may be identified.

Figure 6:
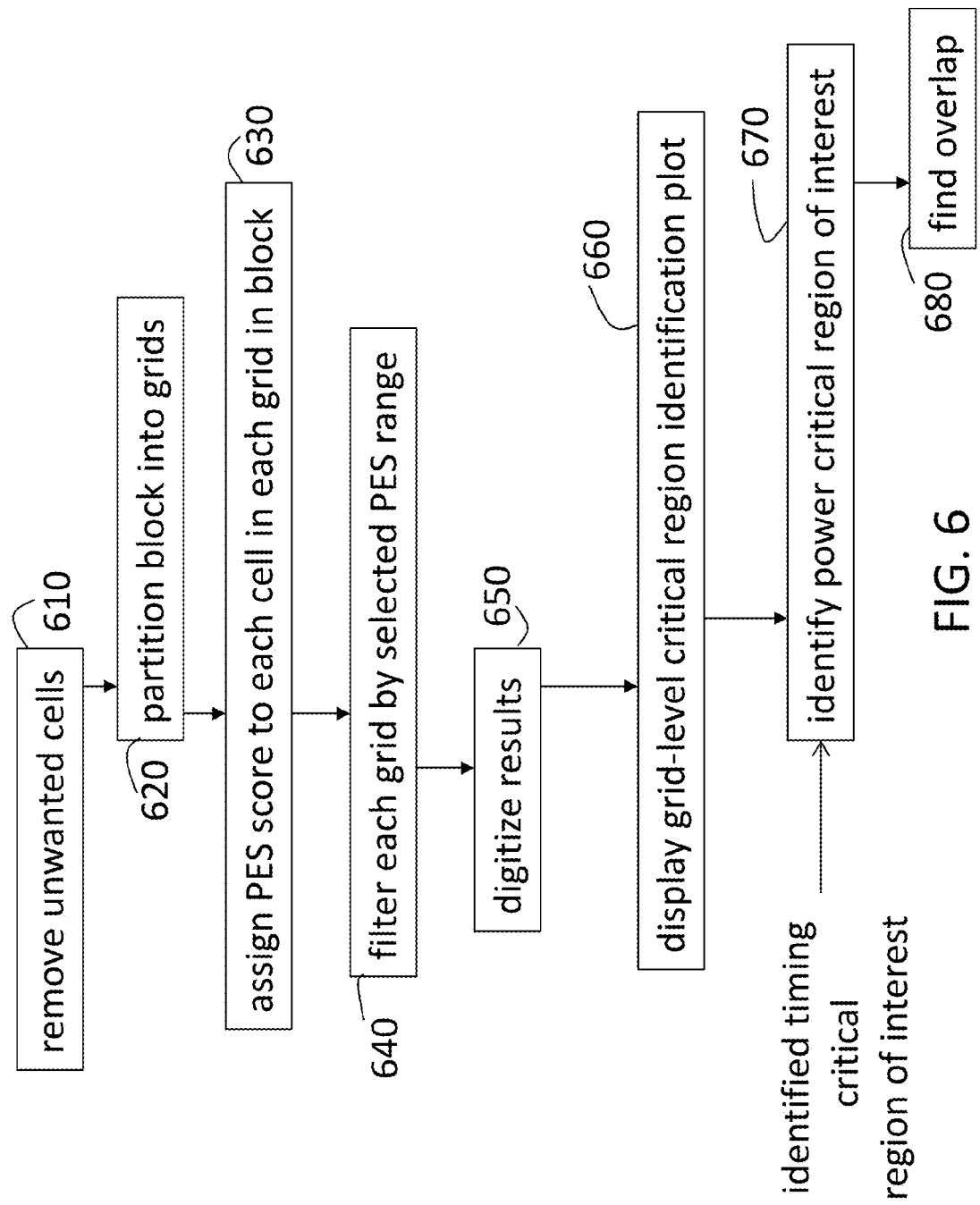
FIG. 6 is a process flow of a method of identifying a region of interest with regard to power efficiency according to an embodiment of the invention.

FIG. 6 is a process flow of a method of identifying a region of interest with regard to power efficiency according to an embodiment of the invention. Removing unwanted cells, at process 610, may be an optional step used to set aside a subset of library cells comprising a range of slack or slew, for example. The removing at block 610 includes extracting cells with the worst slack and slew, threshold voltage VT, and cell drive strength (CDS) of all cells in the design. Slack is the gap between a target power consumption and actual power consumption, and slew is the time required for a power signal to transition from 0 to 1 or 1 to 0. At process 620, partitioning a given block 110 into grids 120 is related to process 210, discussed with reference to FIG. 2. Although not required, the timing and power analysis are more easily processed together if the grids 120 are defined the same way for both analyses. At process 630, assigning a PES to each cell in each grid 120 of the block 110 includes performing the following calculation:

$$PES = \frac{CDS\_assignment\_score \times VT\_assignment\_score}{slack\_achievement\_score \times slew\_achievement\_score} \quad [EQ. 1]$$

The VT assignment score is 1, 2, 3, or 4 based on the threshold voltage used, because the exemplary embodiment discussed herein includes four possible values for VT. Table 1 indicates exemplary scores identified in EQ. 1.

TABLE 1

Exemplary scores used in EQ. 1.

| CDS assignment score | slack achievement score | slew achievement score |
| --- | --- | --- |
| 1: CDS is within min_ CDS and ((max_ CDS − min_ CDS)*25%) for cell_type | 1: slack is less than target_slack | 1: when slew is less than target_slew |
| 2: CDS is within ((max_ CDS − min_ CDS)*25%) and ((max_BHC − min_ CDS)*50%) for cell_type | 2: slack is between target_slack and 20% more than target_slack | 2: slew is between target_slew and 20% more than target_slew |
| 3: CDS is within ((max_ CDS − min_ CDS)*50%) and ((max_BHC − min_ CDS)*75%) for cell_type | 3: slack is between 20% and 40% more than target_slack | 3: slew is between 20% and 40% more than target_slew |
| 4: CDS is within ((max_ CDS − min_ CDS)*75%) and max_ CDS for cell_type | 4: slack is more than 40% above the target_slack | 4: slew is more than 40% above the target_slew |

Figure 7:
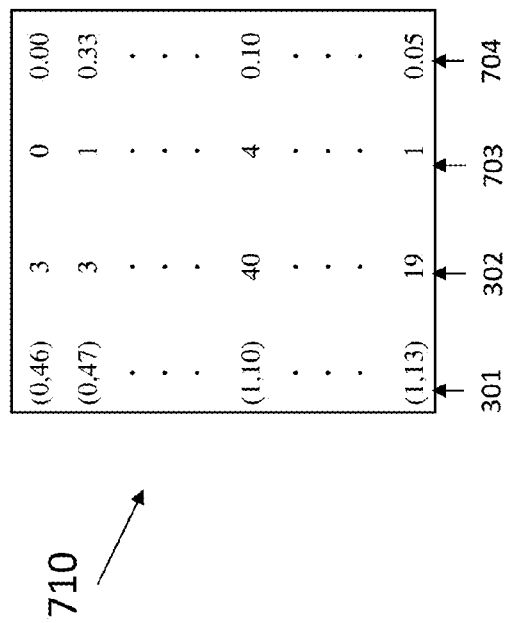
FIG. 7 illustrates an exemplary power table according to embodiments of the invention.

In an exemplary embodiment, the PES is a value in the range 0 to 16, with a score of 16 representing the maximum power inefficiency. Once a PES is assigned to each cell, the processing at processes 640-670 is analogous to the processing at processes 220-250 which are discussed with reference to FIG. 2. At process 640, filtering each grid 120 by a selected PES range is analogous to filtering each grid 120 by a selected timing range as discussed above with reference to process 220. A table similar to the timing table 320 may be generated and is discussed further with reference to FIG. 7. At process 650, digitizing results includes selecting a number of bits with which to code the ratio 704 (FIG. 7). Displaying a grid-level critical region identification plot related to power at process 660 facilitates the selection of one or more regions of interest. As noted above with reference to the timing analysis, a region may be chosen by a designer or by the processing system 130 based on a grid clustering algorithm. While identifying the power critical region of interest, at process 670, is done considering the power alone, a designer may optionally perform finding an overlap, at process 680, between the timing critical region of interest 510 and the power critical region of interest. Finding the overlap (680), visually, manually, or with the processing system 130, may help a designer determine a type of redesign that may better-address overlapping regions.

FIG. 7 illustrates an exemplary power table 710 according to embodiments of the invention. Like the timing table 320 shown in FIG. 3, the exemplary power table 710 indicates the grid address 301 and the total number (A) 302 of logic elements or cells per grid 120. In alternate embodiments in which the grids 120 are defined differently for timing analysis and power analysis, different grid addresses may be indicated in the power table 710 than the timing table 320. The number (C) 703 of cells that are in the specified PES range, and the ratio (A/C) 704 of cells of each grid 120 that fall in the specified PES range are also indicated by the power table 710.

The general principle for analysis of power consumption is based on minimizing unhelpful power use, where unhelpful power use can be thought of as increasing power use that does not result in a corresponding decrease in slack and slew. This general principle is reflected in the definition of PES.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of identifying a region of a design block of an integrated circuit for redesign, the method comprising:
    dividing the design block into grids, each of the grids including a corresponding number of logic elements;
    filtering, using a processor, each of the grids based on a specified criteria, the filtering including determining a number (B) of the corresponding logic elements among a total number (A) of the logic elements in each grid that meet the specified criteria;
    identifying, using the processor, the region as a set of two or more of the grids based on a result of the filtering; and
    computing, using the processor, a power efficiency score (PES) for each of the total number (A) of the logic elements in each grid, wherein the PES is computed for each of the logic elements in each grid as:

$$PES = \frac{\text{CDS\_assignment\_score} \times \text{VT\_assignment\_score}}{\text{slack\_achievement\_score} \times \text{slew\_achievement\_score}}$$

CDS_assignment_score being based on a minimum and maximum cell drive strength (CDS) for each of the logic elements of each of the grids, VT_assignment_score being based on a threshold voltage (VT) used for the logic element, slack_achievement_score being based on slack as compared with a target slack, and slew_achievement_score being based on slew as compared with a target slew.

2. The method according to claim 1, wherein the filtering includes filtering each of the grids based on a specified timing range.

3. The method according to claim 1, wherein the filtering includes filtering each of the grids based on a specified PES range.

4. The method according to claim 1, further comprising the processor determining, for each of the grids, a ratio as A/B, wherein the set of the two or more of the grids is determined based on the respective ratio of the set of the two or more of the grids.

5. The method according to claim 4, further comprising digitizing the respective ratio for each of the grids.

6. The method according to claim 4, further comprising visualizing the respective ratio for each of the grids.

* * * * *